(12) United States Patent
Chan

(10) Patent No.: US 8,315,185 B2
(45) Date of Patent: Nov. 20, 2012

(54) ACK/NACK DETECTION IN LTE PUSCH

(75) Inventor: Wing Chau Chan, Hong Kong (HK)

(73) Assignee: Hong Kong Applied Science and Technology Research Institute Company Limited, New Territories (HK)

( * ) Notice: Subject to any disclaimer, the term of this patent is extended or adjusted under 35 U.S.C. 154(b) by 317 days.

(21) Appl. No.: 12/795,353

(22) Filed: Jun. 7, 2010

(65) Prior Publication Data

US 2011/0300849 A1  Dec. 8, 2011

(51) Int. Cl.
  *H04W 4/00* (2009.01)
  *H04L 12/26* (2006.01)
(52) U.S. Cl. .................... 370/252; 370/328
(58) Field of Classification Search .............. 370/252, 370/310, 328; 714/748
  See application file for complete search history.

(56) References Cited

U.S. PATENT DOCUMENTS

| | | | |
|---|---|---|---|
| 7,693,099 B2 | 4/2010 | Gollamudi et al. | 370/328 |
| 2006/0018259 A1 | 1/2006 | Kadous | 370/350 |
| 2006/0133290 A1 | 6/2006 | Lindoff et al. | 370/338 |
| 2008/0010578 A1 | 1/2008 | Jiang | 714/748 |
| 2008/0155371 A1 | 6/2008 | Mauritz et al. | 714/749 |
| 2009/0129317 A1 | 5/2009 | Che et al. | 370/328 |
| 2009/0245195 A1* | 10/2009 | Bhattad et al. | 370/329 |
| 2010/0091672 A1* | 4/2010 | Ishii | 370/252 |
| 2010/0311458 A1* | 12/2010 | Nakao et al. | 455/517 |

FOREIGN PATENT DOCUMENTS

WO  WO 2008/105421  * 9/2008

OTHER PUBLICATIONS

3$^{rd}$ Generation Partnership Project; 3GPP TS 36.211, V8.9.0 (Dec. 2009).
3$^{rd}$ Generation Partnership Project; 3GPP TS 36.212, V8.8.0 (Dec. 2009).
3$^{rd}$ Generation Partnership Project; 3GPP TS 36.213, V8.8.0 (Sep. 2009).

* cited by examiner

*Primary Examiner* — Kerri Rose
(74) *Attorney, Agent, or Firm* — Ella Cheong Hong Kong; Margaret A. Burke; Sam T. Yip

(57) ABSTRACT

The present invention relates to ACK-NACK detection in an LTE wireless communication system. To determine a threshold value for an ACK-NACK transmission, an SC-FDMA signal is received from user equipment. Then, a power estimate of soft data bits is used to establish a threshold value for determining the presence of an ACK-NACK signal. Using this threshold value, a signal from the user equipment is analyzed to determine if it contains an ACK or NACK transmission.

13 Claims, 4 Drawing Sheets

ACK/NACK DETECTION IN LTE PUSCH

FIELD OF THE INVENTION

The invention relates to LTE wireless communication systems and, more particularly, to the correct determination of ACK-NACK signals in LTE physical uplink shared channels (PUSCH).

BACKGROUND

With the exponential growth of wireless communication, new techniques are needed to handle the high capacity of voice and data carried over wireless communication networks. Long Term Evolution (LTE) is a promising network proposal to meet the challenge of increased traffic. It is noted that the terminology "LTE" is not universal. "LTE" as used herein is as a broad term that, depending on the context, may include the meanings E-UTRA (Evolved Universal Terrestrial Radio Access), E-UTRAN (Evolved Universal Terrestrial Radio Access Network) and SAE (System Architecture Evolution). LTE is sometimes referred to as LTE/SAE. More information on LTE can be found in Rumney, *LTE and the Evolution of 4G Wireless*, John Wiley,© 2009, and Sesia, *LTE: The UMTS Long Term Evolution*, Wiley© 2009, and the standard documents for E-UTRA: 3GPP TS 36.211: "Evolved Universal Terrestrial Radio Access (E-UTRA); Physical channels and modulation;" 3GPP TS 36.212: "Evolved Universal Terrestrial Radio Access (E-UTRA); Multiplexing and channel coding;" 3GPP TS 36.213: "Evolved Universal Terrestrial Radio Access (E-UTRA); Physical layer procedures" the disclosures of which are incorporated by reference herein.

LTE uses orthogonal frequency division multiplexing (OFDM) for radio frequency transmissions in the downlink between a transmitter such as a base station and a user/receiver such as user equipment (UE) (e.g., mobile communication devices such as cell phones, etc.). In the uplink transmission between the user equipment and the base station (typically referred to as "evolved node B" or eNode-B in LTE terminology) through the physical uplink shared channel (PUSCH), a special type of modulation method which is termed single carrier frequency division multiple access (SC-FDMA) is used. Similar to OFDM, SC-FDMA signals carry different orthogonal frequencies, also known as subcarriers. But in contrast to OFDM, the Discrete Fourier Transform (DFT) of the constellation symbols, rather than the constellation symbols themselves, are sent over the subcarriers. As a result, the constellation symbols are sequentially sent in the time domain, and there is a lower peak-to-average power ratio resulting in lower backoff from peak power to achieve higher power efficiency of the high power amplifier of the transmitter.

In the downlink, the data payload is carried by transport blocks which are encoded into codewords which are sent over the downlink physical data channel called Physical Downlink Shared Channel (PDSCH). The scheduling information of the PDSCH codeword(s), including its resource allocation in the subframe and its modulation and coding scheme, is included in the physical control channel, called Physical Downlink Control Channel (PDCCH) [36.212]. Generally, the receiving user equipment decodes the messages in PDCCH and in case it finds that a PDSCH has been assigned to it, it will decode the PDSCH codeword(s) according to the scheduling information decoded from the PDCCH.

In order to prevent the loss of transport blocks, LTE has adopted the Hybrid Automatic Repeat Request (HARQ) scheme. When a base station/eNode-B sends PDSCH to user equipment (downlink transmission) through PDSCH, the data packets are sent together with indicators in PDCCH in the same subframe that inform the receiving user equipment about the scheduling of the PDSCH, including the transmission time and other characteristics of the transmitted data. For each PDSCH codeword that the user equipment receives from the base station/eNode-B, the user equipment responds in the uplink transmission with an acknowledgement (ACK), when the codeword is successfully decoded (indicated by that the CRC check as to the CRC attached with the payload is passed), or a negative acknowledgement (NACK), when the codeword is not successfully decoded (indicated by that the CRC check as to the CRC attached with the payload is not passed). Upon receiving a NACK from the user equipment, eNode-B may choose to retransmit the transport block or skip it. Such mechanism can enhance the system throughput by retransmitting the lost transport blocks in the downlink.

If the user equipment is also transmitting data through PUSCH, the ACK/NACK has to be embedded into the PUSCH. The ACK/NACK information will be encoded and punctured into the data symbols, pursuant to the process prescribed in Section 5.2.2.6 of 36.212. In other words, some of the data symbols are replaced by the ACK/NACK coded symbols. Section 5.2.2.8 of 36.212 prescribes which of the data symbols of the transport blocks are replaced by ACK/NACK symbols, and which are not, derived upon some configurations communicated between UE and the base station/eNode-B, prior to the uplink transmission of the ACK/NACK signals. For the purpose of illustration, we call the positions of those replaced data symbols as "predetermined positions" hereafter.

The channel decoder for the PUSCH codeword and that for the ACK/NACK information are different. Generally, the channel decoder for the PUSCH codeword shall disregard these ACK/NACK coded symbols when decoding the data. And the channel decoder for the ACK/NACK information ("ACK/NACK decoder" hereinafter) shall extract the ACK/NACK symbols only for decoding. Since the PUSCH codeword contains redundancy, it can generally be able to decode with insignificant degradation in robustness, even if some of its data symbols are punctured out.

However, a problem arises when the user equipment is not aware of even the presence of the PDSCH assigned to it, if it fails to decode the PDCCH successfully. In this case the user equipment will not generate ACK/NACK information and its PUSCH will contain data only. This situation has been well recognized and the user equipment response in such case is termed discontinuous transmission (DTX), that is, neither an ACK nor a NACK is transmitted to the base station. Since the eNode-B has no prior knowledge of whether the user equipment fails to detect the PDCCH, it expects that the symbols of the predetermined positions are ACK/NACK symbols and extract them for the ACK/NACK decoder to decode. If the eNode-B receiver disregards the possibility of DTX, either an ACK or NACK would be returned to higher layer, upon the decoding of the extracted symbols which are data in fact, by the ACK/NACK decoder. In general, both ACK and NACK would be equally likely to be returned. If NACK is returned, the eNode-B would assume the PDSCH codeword was not decoded successfully and perform retransmission if appropriate. This would not cause serious problem since the higher layer at eNode-B would still recognize that the PDSCH codeword was actually lost and perform retransmission if it thinks appropriate. A more serious problem arises only when ACK is returned instead, so that the higher layer assumes that the PDSCH codeword has been successfully decoded and skips the retransmission, leading to permanent loss of the transport block.

Hence the consequence of wrongly detecting a DTX as an ACK ("DTX-to-ACK event" hereafter) is more adverse to the system performance than wrongly detecting a DTX into a NACK ("DTX-to-NACK event" hereafter) and is desirable to take more conservative approach in returning an ACK, in order to maintain the DTX-to-ACK probability, which is also referred to as the false alarm rate (FAR). Under this rationale, Section 8.2.4 of 36.104 and Section 8.2.3 of 36.141 prescribe the requirement that the DTX-to-ACK probability should not exceed 0.01, while maintaining certain performance in detection of a true ACK under certain conditions.

Hence, the eNode-B receiver should be so designed that it can, upon the reception of the PUSCH, detect the DTX event and return DTX or NACK to the higher layer, or return NACK to higher layer without explicitly distinguishing whether it is DTX, when DTX event occurs, in order to maintain the DTX-to-ACK probability at a target level. To do so, the base station/eNode-B has to overcome the difficulties arising from reasons such as noise and multipath fading in the wireless communication system.

A common approach to design such receiver is to adopt a threshold-based algorithm for determination of an ACK/NACK signal. That is, in general, the output of the soft channel decoder for the ACK/NACK information is compared with one or more thresholds. These thresholds partition the range of output into multiple intervals. Whether ACK, NACK or DTX is determined, it depends on the interval the value or the magnitude falls into, and this in turn depends on the actual design of the decoder. The challenge of these methods is to design the computation of these thresholds. Existing methods for computing a threshold to achieve a target false alarm rate include those which are implemented in the Constant False Alarm Rate (CFA) detector, a dynamic threshold detector proposed by Philips, and a selective threshold ACK/NACK detector proposed by Huawei Technologies. All of these methods relate to the use of a channel estimate and a noise/signal-to-interference-plus-noise ratio (noise/SINR) from reference symbols in an SC-FDMA frame. Thus the channel estimator and/or the noise estimator are used for determining whether an ACK or NACK transmission has been made from the reference signal.

However, the SINR estimate per subframe is not very precise, particularly in the low SNR regime. Also it generally does not take into account the channel estimation error. Hence the robustness to channel variations of the resulting threshold determination is undermined and a higher margin in the threshold is needed to comply with a given error requirement, thus increasing the misdetection rate.

U.S. Patent Publication 2006/0133290 is directed to improving ACK detection in a mobile terminal by estimating the probability of a discontinuous transmission and then calculating a minimum acknowledgement signal threshold for the mobile terminal using the estimated probability. A detected signal is determined to be an ACK signal or not based on the minimum acknowledgement threshold.

All of the existing methods as previously described for computing the ACK/NACK threshold utilize the channel and noise estimates based on the reference signal symbols to generate the threshold value. However, there are certain drawbacks in using the above estimates. For example, the computed threshold and the predetermined positions of the ACK/NACK signals which will be compared with that computed threshold will be from different stages of the decoding process at the base station/eNode-B, and so the amount of error that has been introduced into the computation of the threshold and the predetermined positions of the ACK/NACK signal would be different and hence it may not be appropriate to compare the computed threshold directly with the predetermined positions for the ACK/NACK signals. Additionally, there are only two reference signal symbols out of the fourteen SC-FDMA symbols in each SC-FDMA subframe; the remaining symbols are data-containing symbols (possibly also containing ACK/NACK signals). Since only the two reference signal symbols can be used in the existing threshold computation methods, the amount of tradeoff available between the complexity and the accuracy of the threshold computation is limited. Moreover the accuracy of the threshold computation is also limited due to the small number of reference signal symbols that can be used.

Thus, there remains a need in the art for improved ACK-NACK detection in LTE communication systems.

SUMMARY OF THE INVENTION

The present invention relates to ACK-NACK detection over PUSCH in an LTE wireless communication system. It also adopts the threshold-based approaches to maintain the target DTX-to-ACK probability. To determine a threshold value for an ACK-NACK transmission for such purpose, an SC-FDMA transmission is received from user equipment. Then, a power estimate of the received soft bits is made and used to establish a threshold value for determining the presence of an ACK-NACK signal. Using this threshold value, a signal from the user equipment is analyzed to determine if it contains an ACK/NACK signal.

In a further aspect, the present invention relates to an LTE wireless communication system. The system includes a receiver for receiving transmissions from user equipment and an antenna electrically communicating with the receiver. User equipment, such as a mobile telephone, is provided for transmitting an SC-FDMA signal to the receiver. The receiver includes a ACK/NACK detector and a threshold computation module. The threshold computation module is included for calculating an ACK-NACK threshold level from bits received from the user equipment. The ACK/NACK detector comprises a soft channel decoder for the ACK/NACK information and a decision-maker. The decision-maker compares the threshold level computed by the threshold computation module with the output of the soft channel decoder to determine if the SC-FDMA signal received from the user equipment includes an ACK, a NACK or merely data (i.e. DTX). See FIG. 3.

DETAILED DESCRIPTION

Figure 1:
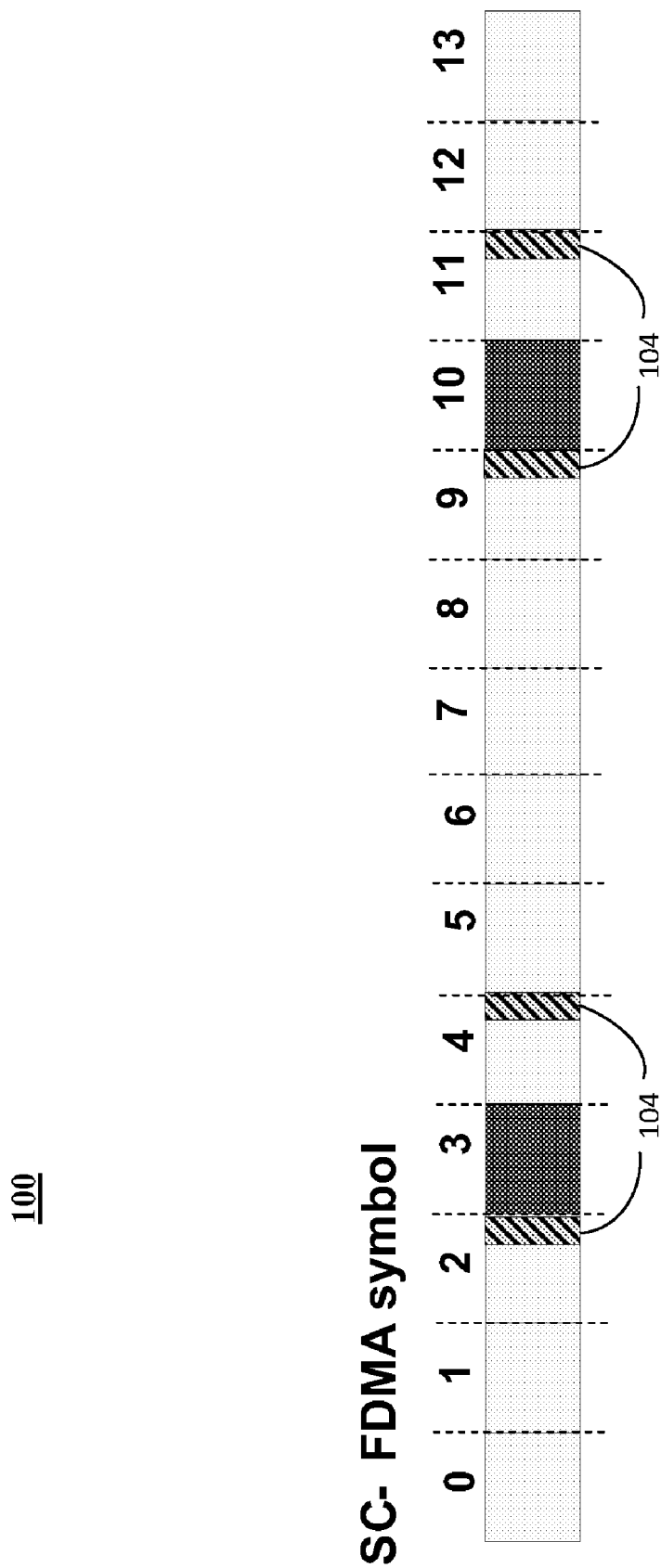
FIG. 1 depicts an SC-FDMA subframe.

The present invention provides an improved method and apparatus for distinguishing ACK/NACK transmissions from data/DTX. In FIG. 1 an SC-FDMA subframe 100 is depicted. This subframe forms part of data being transmitted in the physical uplink shared channel (PUSCH) between user equipment (UE) and a base station/eNode-B. As used herein, the expression "base station" is used to describe the system that receives signals from user equipment such as mobile telephones. In LTE, the base station is usually referred to as "evolved Node B" or eNode-B. The expression "base station" includes this meaning as well as any receiver/antenna system that can communicate with user equipment in an LTE network. SC-FDMA subframe 100 includes 14 SC-FDMA symbols, numbered 0-13 in FIG. 1. In the exemplary embodiment showing subframe 100, symbols 3 and 10 are reference signal symbols 102 used for channel estimation. These reference signal symbols are essentially the pilot symbols in LTE, which are used for channel estimation for the demodulation of the data SC-FDMA symbols of the subframe. All the other 12 SC-FDMA symbols are data SC-FDMA symbols which contain data symbols from user equipment (UE) to the base station/eNode-B. To avoid ambiguity from "data SC-FDMA symbol," a "data symbol" refers to a constellation symbol which is representing several coded bits. The symbol can be QPSK, 16QAM, 64QAM, representing two, four, and six coded bits respectively. A data SC-FDMA symbol, excluding the cyclic prefix, generally consists of as many data symbols as the number of subcarriers assigned to such SC-FDMA symbol. In particular, symbols 0, 6, 7, and 13 are always used solely for transmission of data symbols, and symbols 2, 4, 9 and 11 may also contain ACK/NACK symbols 104 besides the data symbols.

Similar to "data symbol," an "ACK/NACK symbol" refers to a constellation symbol which is representing several coded bits of HARQ information (or ACK/NACK information). The symbol can either be BPSK or QPSK, representing one or two respectively. It may be inserted into a data SC-FDMA symbol, by puncturing some data symbols therein as discussed above.

Figure 2:
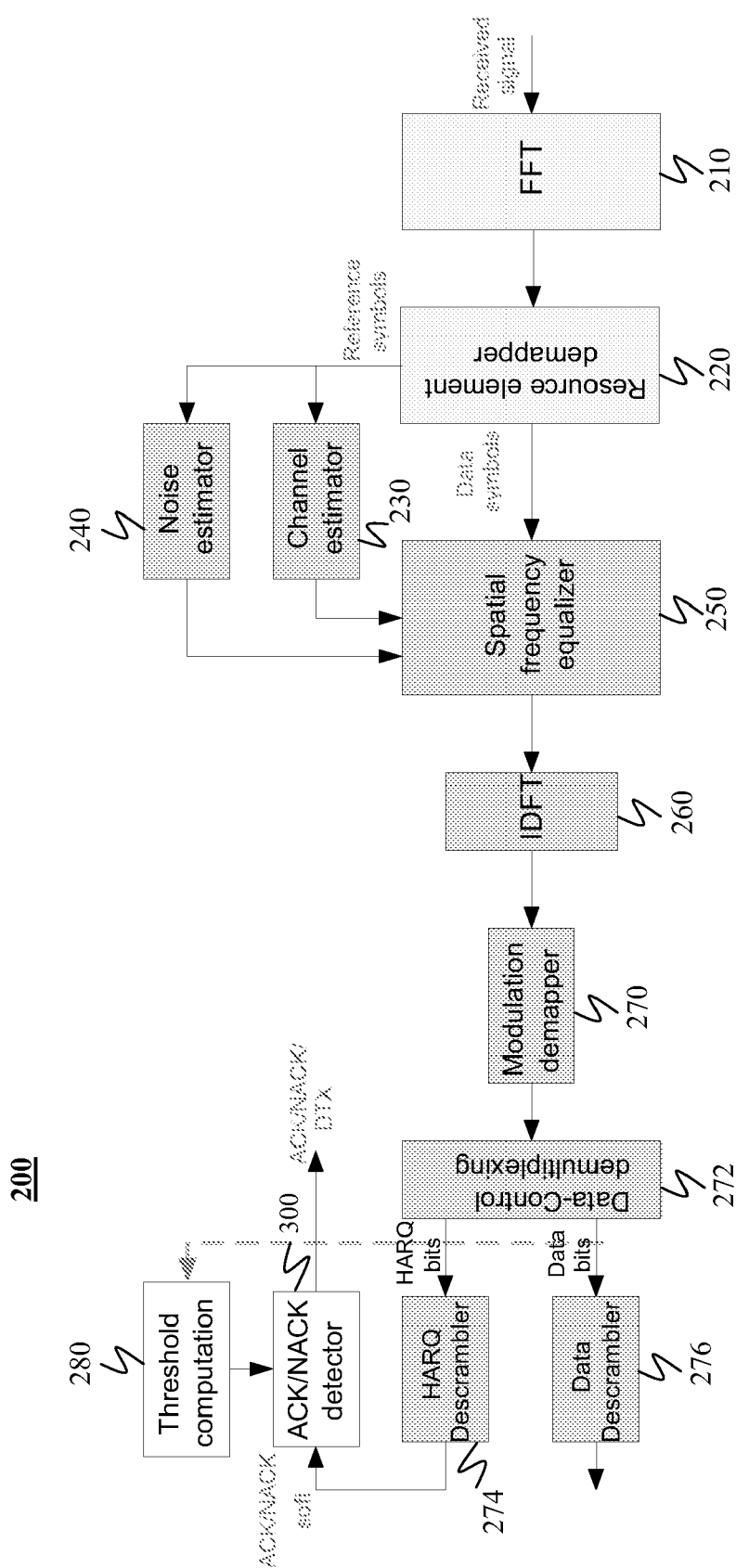
FIG. 2 schematically depicts a base station/eNode-B for receiving a signal through a physical uplink shared channel (PUSCH) from user equipment.

FIG. 2 schematically depicts a base station/eNode-B 200 for receiving data being transmitted in the physical uplink shared channel (PUSCH) from the user equipment. The data is received by an antenna and undergoes analog to digital conversion (not shown). The converted signal is sent to a FFT module 210 which recovers the combinations of subcarriers in the received signal; this data has both real and imaginary components. The FFT output is sent to a resource element demapper 220 which extracts a frequency-domain signal to which data is mapped and outputs reference symbols to a channel estimator 230 and to a noise estimator 240. Data symbols output by the resource element demapper 220 are output to a spatial frequency equalizer 250 which uses the noise estimator 240 output and the channel estimator 230 output to create output compensated for channel phase and magnitude variations.

The signal output by the spatial frequency equalizer is input to IDFT module 260. In this module, the signal is transformed into a time-domain signal by IDFT signal processing. This signal is output to modulation demapper 270.

Modulation demapper 270 performs the function of converting a signal from a given modulation scheme such as QAM (quadrature amplitude modulation) or QPSK (quadrature phase shift key) into corresponding data values. Modulation demapper 270 places bits in essentially the same order as the originating signal. The output of modulation demapper 270 is a serial data bit stream.

Modulation demapper 270 in the present invention is a standard modulation demapper that is commonly used in the communications field, an example of which is described in "Simplified Soft-Output Demapper for Binary Interleaved COFDM with Application to HIPERLAN/2", HPL-2001-246, Hewlett-Packard, 10 Oct. 2001, the disclosure of which is incorporated by reference herein. Its function is to map each input symbol into multiple soft values, each representing the likelihood of a particular coded bit in the symbol. These soft values are regarded as "soft bits". A larger positive value indicates that the coded bit is more likely to be bit "0" and a larger negative value indicates that the coded bit is more likely to be bit "1".

The output of modulation demapper 270 is fed into data-control demultiplexing module 272, which then separates the soft bits generated in modulation demapper 270 into two different types. The first type is the "ACK/NACK soft bits," or HARQ bits, i.e., information bits which, based on the predetermined positions (e.g., locations 104 in FIG. 1), are expected to contain an ACK or NACK transmission, if present in the communication from the user equipment. The data-control demultiplexing module 272 separates the ACK/NACK soft bits by extracting them from the predetermined positions, from the remaining data soft bits. The latter are "pure-data soft bits" which is the second type of output. They are purely data soft bits of the data payload and do not contain any control information. The ACK/NACK soft bits are sent to HARQ descrambler 274, and the pure data soft bits are sent to both threshold computation module 280 and data descrambler 276. The output of HARQ descrambler 274 are descrambled ACK/NACK soft bits which are essentially in the right order, and the output of data descrambler 276 are descrambled data bits which can then be fed into a channel deinterleaver (not shown) to put the data bits into the right order, a rate-dematching module (not shown) to insert zeros for the bits punctured in the rate-matching process at the transmitter and a Turbo decoder (not shown) for further decoding.

Figure 3:
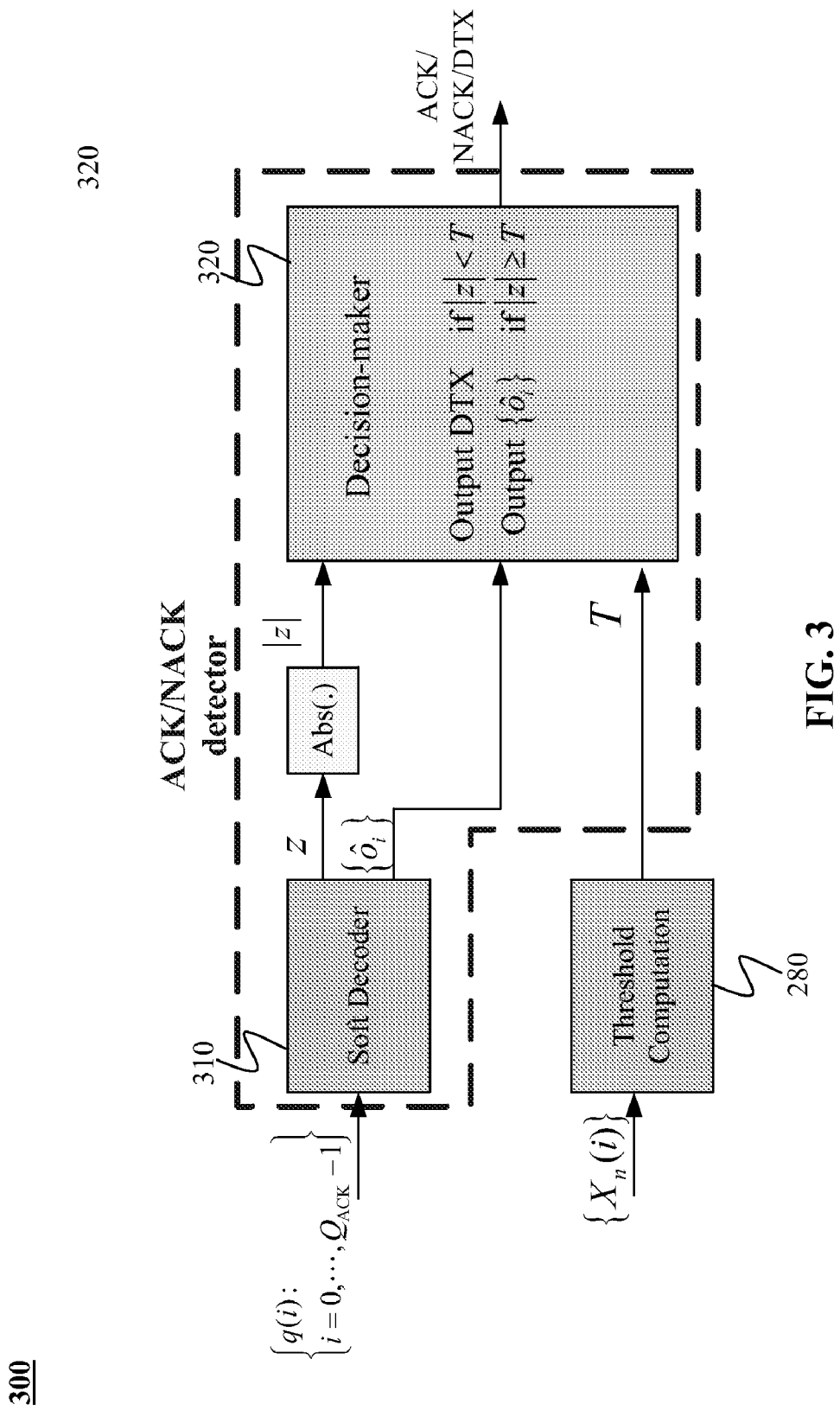
FIG. 3 schematically depicts a threshold computation module and an ACK/NACK detector.

Turning to FIG. 3, the ACK/NACK soft bits are sent to ACK/NACK detector 300. Module 300 includes soft decoder 310 and a decision-maker module 320 which determines whether a data symbol is ACK/NACK or DTX based on whether the threshold value determined from a threshold computation module 280 has been met. Calculation of the threshold value will be discussed in detail below.

In soft decoder 310, the following algorithm is carried out. First, define Q' as the number of ACK/NACK symbols. In LTE PUSCH, soft decoder 310 includes multiple decoders for different numbers of ACK/NACK information bits (i.e. source bits of the ACK/NACK information). When M represents the number of ACK/NACK information bits, the following three cases arise:

For the case of M=1:

Define $Q_{ACK}$, the number of ACK/NACK soft bits as $Q_{ACK}=Q'$, where Q' is the number of ACK/NACK symbols.

For this case, a soft metric, z, is computed:

$$z = \sum_{i=0}^{Q_{ACK}-1} q(i)$$

where q(i) is the i-th ACK/NACK soft bits. A larger magnitude of z indicates a higher likelihood that ACK/NACK information has been sent, rather than DTX.

For the case of M=2, $Q_{ACK}=2Q'$. As shown in the calculations below, the soft metric z is defined to be the value of the maximum component of the resulting matrix after the process of linear filtering, which is a matrix multiplication between the matrices as given below:

$$p(j) = \sum_{k=0}^{\lfloor (Q_{ACK}+2-j)/3 \rfloor - 1} q(3k+j)$$

$$[s(0)\ s(1)\ s(2)\ s(3)] = [p(0)\ p(1)\ p(2)] \begin{bmatrix} 1 & -1 & 1 & -1 \\ 1 & 1 & -1 & -1 \\ 1 & -1 & -1 & 1 \end{bmatrix}$$

$$z = s(i^*)$$

$$(\hat{o}_0, \hat{o}_1) = \begin{cases} (0,0), & \text{if } i^* = 0 \\ (1,0), & \text{if } i^* = 1 \\ (0,1), & \text{if } i^* = 2 \\ (1,1), & \text{if } i^* = 3 \end{cases}$$

where $i^* = \arg\max_{i \in [0,1,2,3]} s(i)$.

In the third case, where M>2, the soft metric z is calculated as follows:

$$Q_{ACK} = Q_m \cdot Q'$$

$$B = \left\lceil \frac{Q_{ACK}}{32} \right\rceil$$

$$p(j) = \frac{1}{B} \sum_{k=0}^{\lfloor (Q_{ACK}+31-j)/32 \rfloor - 1}$$

$$\{p(j) : j = 0, \ldots, 31\} \longrightarrow \boxed{\text{(32,O) Block decoder}} \xrightarrow{\text{Binary } y} \{\hat{o}_i\} \otimes \longrightarrow z$$

$$\uparrow B$$

for $j = 0, \ldots, 31$ $$Z = \frac{B \cdot y}{2}$$

where the (32,O) block decoder is a Fast Hadamard Transform decoder.

The absolute value of z is input to decision-maker module 320 to determine whether it is greater than the threshold value computed in threshold computation module 280, discussed below.

The data soft bits from data-control demultiplexing module 272 that do not contain ACK/NACK are sent to the threshold computation module 280. The threshold computation module computes a power estimate of the random data (that is, data not containing ACK/NACK). For an input, $X_n(i)$, of the i-th soft bit of the n-th data symbol, for i=0 to $Q_m-1$ where $Q_m$ is the modulation level.

Define $\hat{P}_{RD}(i)$ as the random data power estimation for the i-th pair of soft bits of each symbol, for $$i = 0, \ldots, \frac{Q_m}{2} - 1,$$

where $Q_m$ is the modulation level of the data symbol. For example, $\hat{P}_{RD}(0)$ is the sum of the mean powers of the first two bits of the symbol; $\hat{P}_{RD}(1)$ is the sum of the mean powers of the third and fourth bit of the symbols and so on.

$$\hat{P}_{RD}(i) = \frac{1}{2M_{Data}} \sum_{n=0}^{M_{Data}-1} (|X_n(2i)|^2 + |X_n(2i+1)|^2), \text{ for } i = 0, \ldots, \frac{Q_m}{2} - 1$$

where $M_{data}$ is the number of data symbols to be used for the random data power estimate.

Using the computed power estimate of the random data, the threshold (T) computation is performed.

Moreover, the method of threshold computation is dependent on M, which ranges from 1 to 4.

Case 1: M=1, without bundling $$T = \delta \cdot \sqrt{\hat{P}_{RD}(0) \cdot Q_{ACK}}/2$$

Case 1A: M=1, with bundling $$T = (\alpha + \delta\beta) \cdot \sqrt{\frac{\hat{P}_{RD}(0)}{2}} \cdot \sqrt{Q_{ACK}}$$

where $\alpha$=2.0719 and $\beta$=0.8068 are empirically determined parameters that respectively represent the mean and standard deviation of the output soft metric corresponding to zero-mean and unit variance Gaussian noise input to the decoder and $Q_{ACK}$ is the number of soft bits encoded for HARQ.

Case 2: M=$^2$ $$T = (\alpha + \delta\beta) \cdot \sqrt{\frac{\hat{P}_{RD}(0)}{2}} \cdot \sqrt{Q_{ACK}}$$

where $\alpha$=1.19 and $\beta$=0.5689 if bundling is used, and $\alpha$=1.8147 and $\beta$=0.5161 if bundling is not used.

Case 3: M/>2

$$T = (\alpha + \delta\beta) \cdot \sqrt{\frac{\sum_{i=0}^{\frac{Q_m}{2}-1} \hat{P}_{RD}(i)}{Q_m}} \cdot \sqrt{Q_{ACK}}$$

where $\alpha$ and $\beta$ are the mean and standard deviation of the output soft metric corresponding to zero-mean and unit variance Gaussian noise input to the decoder:

$$(\alpha, \beta) = \begin{cases} (1.4722, 0.5710) & M = 3 \\ (1.7859, 0.5279) & M = 4. \end{cases}$$

The values of $\alpha$ and $\beta$ are found by computer simulation using the genuine zero-mean, unit-variance Gaussian random variables as the input of the soft decoder, and are pre-programmed into threshold computation module 280. These quantities are the sample mean and variance of the output of the soft decoder. The probability density function of the soft decoder output is approximated by Gaussian distribution. Since the soft decoder output samples are independent and identically-distributed (i.i.d.) with respect to one or multiple distributions, under the law of large numbers, the actual distribution of the soft decoder output will approach that of a Gaussian distribution, or the distribution of a sum of Gaussian random variables with different means and variances, which is equal to a Gaussian distribution whose mean is equal to the sum of their means and whose variance is equal to the sum of their variances. As all inputs have zero mean, the mean of the resulting limiting distribution is zero, and the variance is the average variance of those inputs.

It is valid to ignore the fact that the variances of the different bits in a constellation symbol (as in 16QAM and 64QAM) are different, since the variance of the limiting distribution does not depend on their individual variances, but on their sum.

And for all decoders, each corresponding to a different number of ACK/NACK information bits, when the input is scaled, the output will be scaled by the same factor. Hence the mean and the standard deviation of the limiting distribution of the soft decoder will also be scaled by the same factor. Accordingly, the threshold is proportional to the square root of the average power of each input bit, which is estimated directly from the data bits contained in some data SC-FDMA symbols. The term, $$\sqrt{\frac{\hat{P}_{RD}(0) + \hat{P}_{RD}(1)}{2}},$$

represents the mean power of each ACK/NACK soft bit, where $\hat{P}_{RD}(i)$ is the estimated power of the i-th bit of the constellation symbol. Moreover, this is proportional to the total number of ACK/NACK bits, since the soft decoder output is always a sum of the input soft bits.

Once the threshold value T is calculated, it is sent to decision-maker module 320 where the absolute value of z is compared to T. If the absolute value of z is greater than the threshold value T, the transmission is determined to be an ACK/NACK transmission and the decoded ACK/NACK bits $\{\hat{o}_i\}$ will be passed to higher layer. If the absolute value of z is less that the threshold value T, then the transmission is determined to be a DTX transmission.

After ACK/NACK detector 300 has determined whether an ACK, NACK or DTX signal has been transmitted, the decision is passed from the physical (PHY) layer to the medium access control (MAC) layer. Simultaneously, based on this decision ACK/NACK detector 300 will decide whether retransmission of the relevant downlink transport block is required, and schedule accordingly the traffic in the subsequent subframes via the MAC layer.

Figure 4:
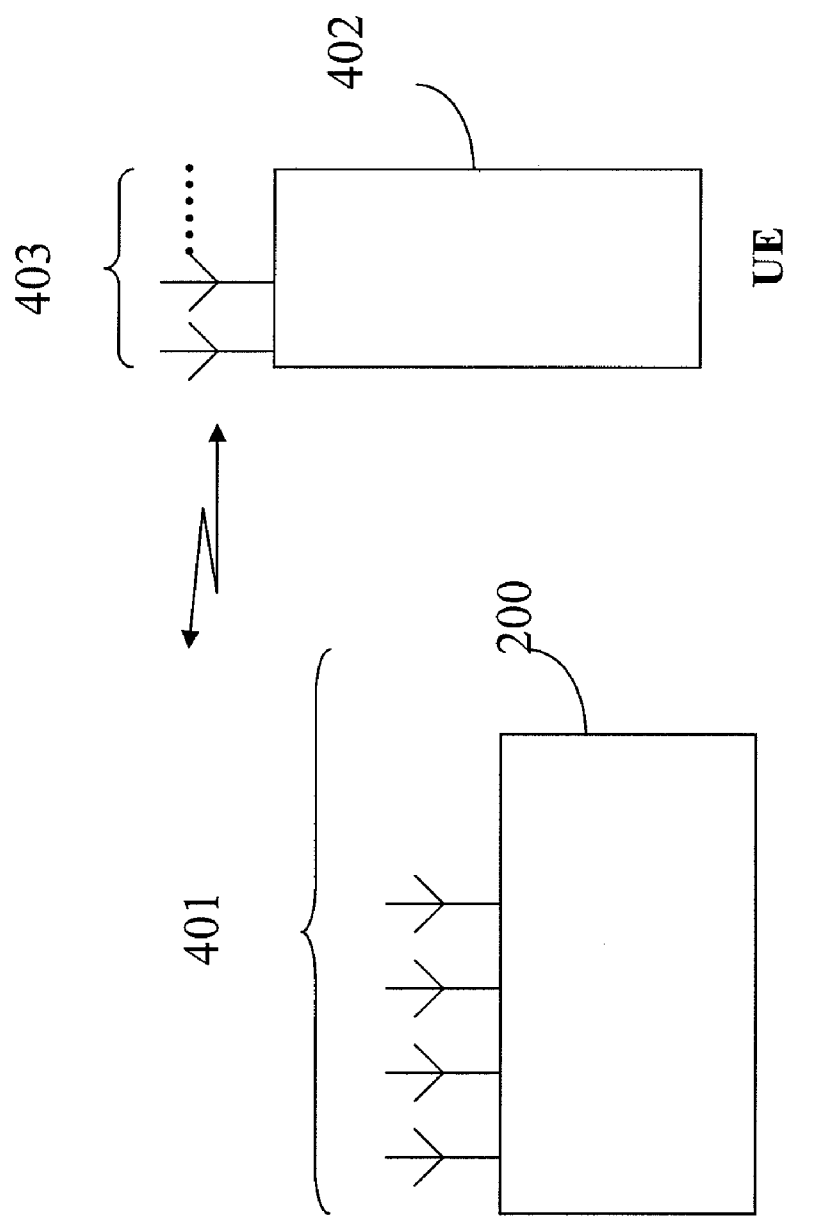
FIG. 4 schematically depicts a LTE system incorporating the features of the present invention.

A schematic depiction of an LTE system which includes reception of signals and detection of ACK/NACK as set forth above is schematically depicted in FIG. 4. A base station/eNodeB 200 includes the features depicted in FIGS. 2 and 3 as well as known base station/eNodeB elements such as antennas 401. The base station receives signals from user equipment 402 via UE antennas 403 and determines whether an ACK or NACK transmission is included as described in detail above.

While the foregoing invention has been described with reference to the above exemplary embodiments, it is understood by those of ordinary skill in the art that various changes and substitutions may be made without departing from the spirit and scope of the present invention. Further, although elements of the invention may be described or claimed in the singular, the plural is also contemplated unless limitation to the singular is explicitly set forth. Therefore, each of foregoing embodiments and obvious variations thereof are deemed to fall within the scope of the following claims.

What is claimed is:

1. In a LTE wireless communication system, a method for determining the presence of an ACK or NACK transmission comprising:
   receiving an SC-FDMA signal transmitted from user equipment;
   using a power estimate of received random data bits that do not include a reference signal to establish, without involving an estimate of noise in the received random data bits, a threshold value for determining an ACK-NACK signal, wherein the received random data bits being received via a physical uplink shared channel and the power estimate being computed according to soft bits corresponding to the received random data bits; and
   using the threshold value to determine if the transmitted signal from the user equipment contains an ACK or NACK transmission.

2. A method of determining the presence of an ACK or NACK transmission according to claim 1 wherein for an input, $X_n(i)$, of the i-th soft bit of the n-th data symbol, for i=0 to $Q_m-1$ where $Q_m$ is a modulation level, the power estimate is calculated using the following equation:

$$P_{RD}(i) = \frac{1}{2M_{Data}} \sum_{n=0}^{M_{Data}-1} (|X_n(2i)|^2 + |X_n(2i+1)|^2), \text{ for } i = 0, \ldots, \frac{Q_m}{2} - 1$$

where $M_{data}$ is the number of data symbols to be used for the power estimation.

3. A method of determining the presence of an ACK or NACK transmission according to claim 1 wherein if the threshold value is not met, the transmission is determined to be DTX.

4. A method of determining the presence of an ACK or NACK transmission according to claim 3 wherein, based on the determination of an ACK or NACK or DTX transmission, the LTE system decides whether or not to retransmit a relevant downlink transport block.

5. A LTE wireless communication system comprising:
   a base station for receiving SC-FDMA transmissions from user equipment; the base station including a receiver which includes:
   a threshold computation module for calculating an ACK-NACK threshold value based on a power estimate of data bits received from the user equipment that do not contain a reference signal, without involving an estimate of noise in the data bits in the calculating of the threshold value, wherein the data bits being received via a physical uplink shared channel and the power estimate being computed according to soft bits corresponding to the data bits; and
   an ACK-NACK detector that uses the threshold value to determine if the SC-FDMA signal received from the user equipment includes an ACK or NACK transmission.

6. A LTE wireless communication system according to claim 5 further comprising a data-control demultiplexer that separates data bits from bits which may contain ACK or NACK data.

7. A LTE wireless communication system according to claim 6 further comprising a modulation demapper.

8. A LTE wireless communication system according to claim 7 wherein the modulation demapper outputs the soft bits.

9. A LTE wireless communication system according to claim 8 further comprising a data descrambler and a HARQ descrambler.

10. A LTE wireless communication system according to claim 8 wherein the ACK-NACK detector comprises a soft decoder receiving the soft bits from the modulation demapper and a determination module for determining whether output from the soft decoder meets the threshold value computed in the threshold computation module.

11. A LTE wireless communication system according to claim 10 in which the soft decoder performs a calculation which, for an input, $X_n(i)$, of the i-th soft bit of the n-th data symbol, for i=0 to $Q_m-1$ where $Q_m$ is a modulation level, the power estimate is calculated using the following equation:

$$P_{RD}(i) = \frac{1}{2M_{Data}} \sum_{n=0}^{M_{Data}-1} (|X_n(2i)|^2 + |X_n(2i+1)|^2), \text{ for } i = 0, \ldots, \frac{Q_m}{2} - 1$$

where $M_{data}$ is the number of data symbols to be used for the power estimate.

12. A LTE wireless communication system according to claim 5 wherein the base station is an evolved Node B.

13. In a LTE wireless communication system, a method for determining the presence of an ACK or NACK transmission comprising:

receiving an SC-FDMA signal transmitted from user equipment;

using a power estimate of received random data bits that do not include a reference signal to establish, without involving an estimate of noise in the received random data bits, a threshold value for determining an ACK-NACK signal; and using the threshold value to determine if the transmitted signal from the user equipment contains an ACK or NACK transmission;

wherein for an input, $X_n(i)$, of the i-th soft bit of the n-th data symbol, for i=0 to $Q_m-1$ where $Q_m$ is a modulation level, the power estimate is calculated using the following equation:

$$P_{RD}(i) = \frac{1}{2M_{Data}} \sum_{n=0}^{M_{Data}-1} (|X_n(2i)|^2 + |X_n(2i+1)|^2), \text{ for } i = 0, \ldots, \frac{Q_m}{2} - 1$$

where $M_{data}$ is the number of data symbols to be used for the power estimation.

* * * * *